Figure 5:
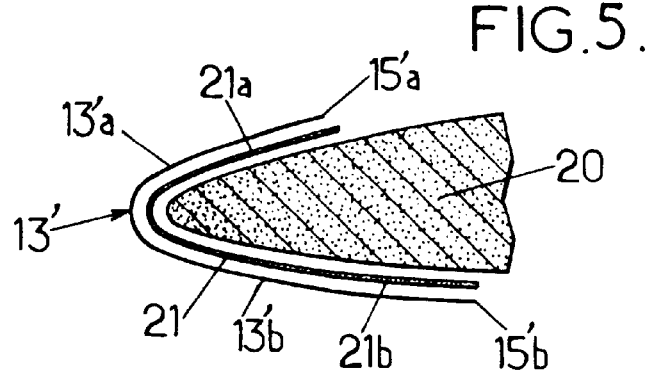

United States Patent
Bost et al.

[11] Patent Number: 6,102,662
[45] Date of Patent: Aug. 15, 2000

[54] BLADE WITH SHIELDING FOR ENHANCED PROTECTION AGAINST LIGHTING, FOR ROTORCRAFT ROTOR

[75] Inventors: Michel Fernand Bost, Joinville-le-Pont; Jean-Cyril Pierre Bauchet, Montgeron; Daniel Brunner, Soisy-Sous-Montmorency, all of France

[73] Assignee: Eurocopter, Marignane Cedex, France

[21] Appl. No.: 09/115,538

[22] Filed: Jul. 15, 1998

Related U.S. Application Data

[63] Continuation of application No. 08/757,967, Nov. 25, 1996, Pat. No. 5,863,181.

[30] Foreign Application Priority Data

Nov. 29, 1995 [FR] France ................... 95 14127

[51] Int. Cl.$^7$ ................... B63H 1/26; F01D 5/14
[52] U.S. Cl. ................... 416/224; 416/229 R
[58] Field of Search ................... 416/224, 229 R, 416/226

[56] References Cited

U.S. PATENT DOCUMENTS

| | | | |
|---|---|---|---|
| 1,404,849 | 1/1922 | Hamilton | 416/224 |
| 1,490,256 | 4/1924 | Caldwell et al. | 416/224 |
| 1,793,775 | 2/1931 | Charavay | 416/224 |
| 1,842,178 | 1/1932 | Kempton | 416/224 |
| 3,782,856 | 1/1974 | Salkind et al. | 416/226 |
| 3,923,421 | 12/1975 | Carter | 416/224 |
| 4,022,546 | 5/1977 | Drees et al. | 416/226 |
| 4,120,610 | 10/1978 | Braswell et al. | 416/226 |
| 4,738,594 | 4/1988 | Sato et al. | 416/224 |
| 4,944,655 | 7/1990 | Merz | 416/224 X |
| 5,225,844 | 7/1993 | Williams | 343/705 |
| 5,306,120 | 4/1994 | Hammer et al. | 416/224 |
| 5,346,367 | 9/1994 | Doolin et al. | 416/230 |
| 5,716,193 | 2/1998 | Mondet et al. | 416/134 A |
| 5,885,059 | 3/1999 | Kovalsky et al. | 416/224 |

*Primary Examiner*—John E. Ryznic
*Attorney, Agent, or Firm*—Henderson & Sturm LLP

[57] ABSTRACT

The shielding of the blade against lightning comprises a conducting component forming a leading edge glove and a cover for protecting the blade tip across its entire chord. Mechanical means, such as screws and rivets, with protruding shapes, fix the cover on the composite structure of the blade, in addition to some gluing, possibly conductive gluing, and are earthed by the cover, forming points where the lightning can enter or exit, protecting the surrounding composite structure of the blade against damage. At least the cover may have a suction face arm and a pressure face arm of different dimensions, at least in the direction of the span. When the blade is mounted on a member for linking to the hub, electrical continuity with this member and the hub is provided.

23 Claims, 5 Drawing Sheets

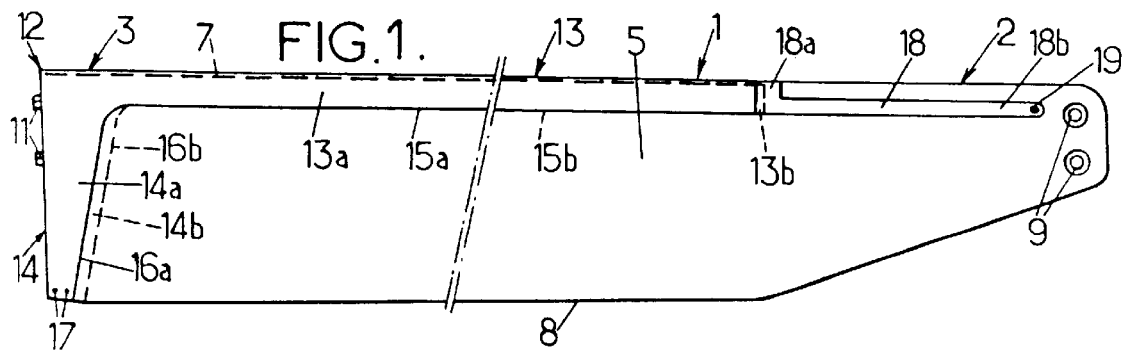
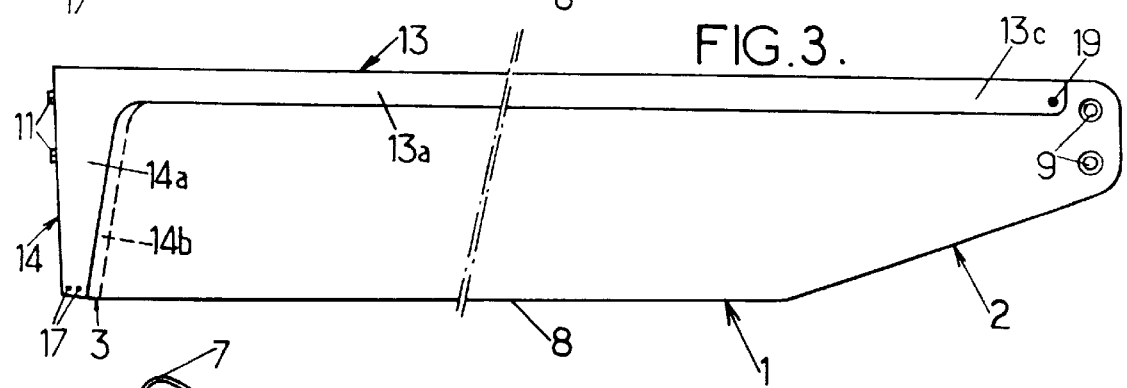
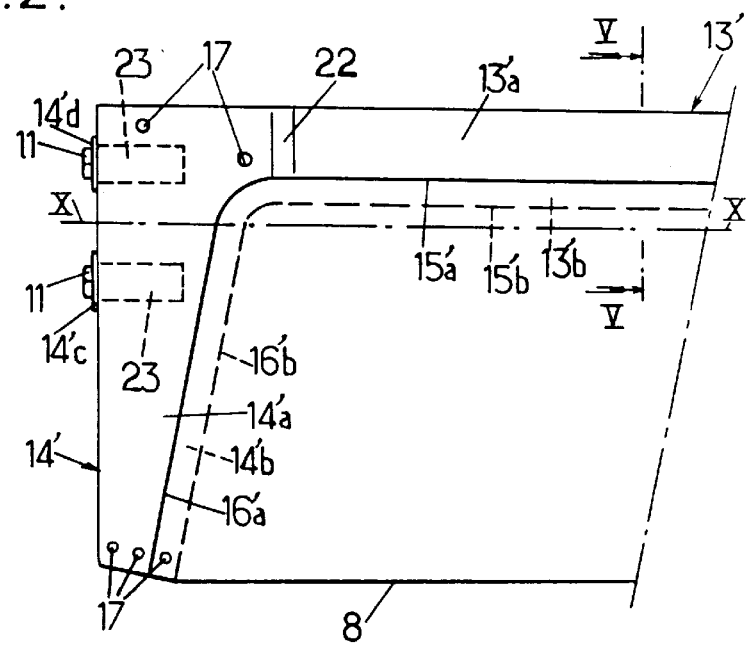

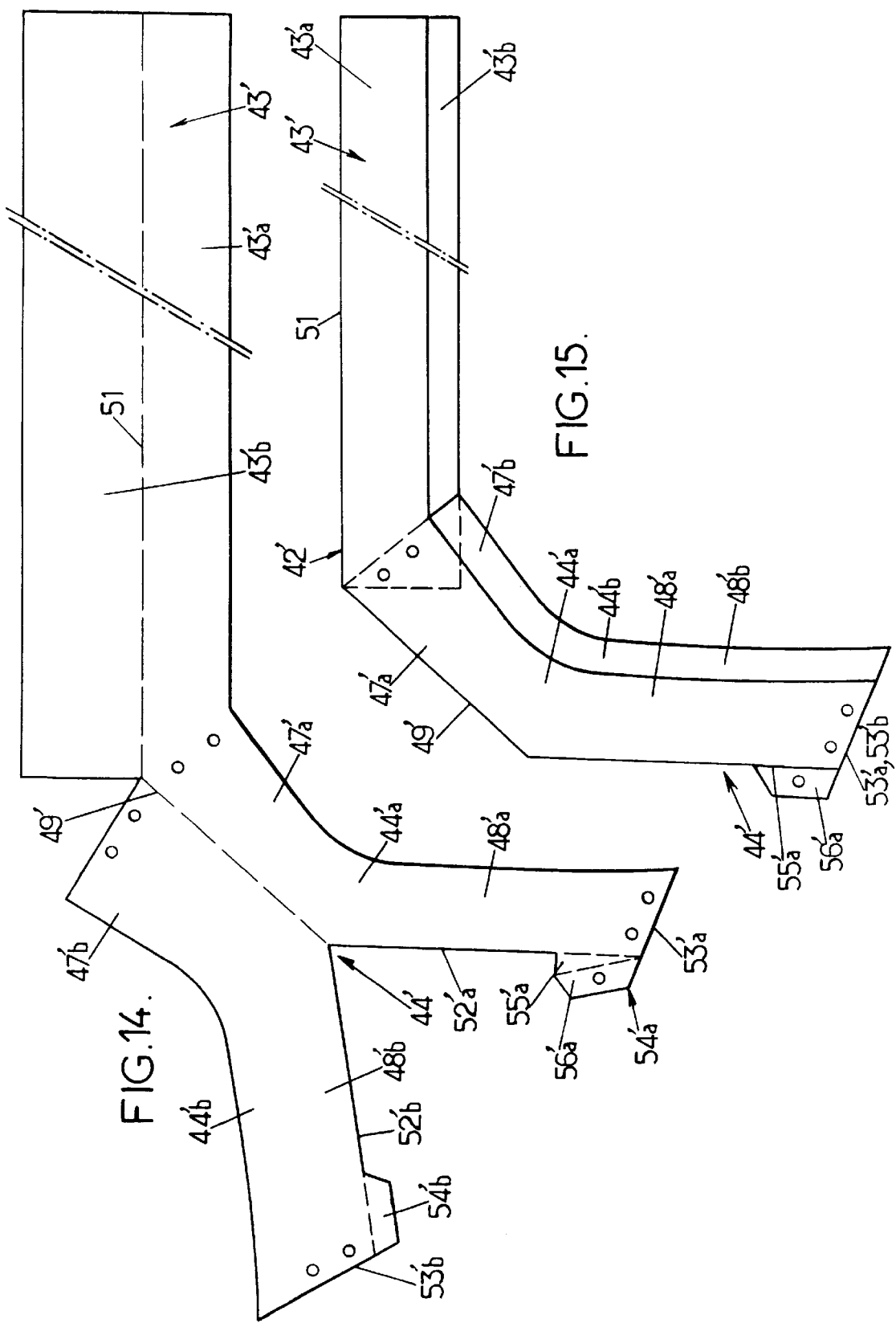

BLADE WITH SHIELDING FOR ENHANCED PROTECTION AGAINST LIGHTING, FOR ROTORCRAFT ROTOR

RELATED APPLICATION

This continuation application is a continuation of Ser. No. 08/757,967 filed Nov. 25, 1996 U.S. Pat. No. 5,863,181 entitled Blade With Shielding for Enhanced Protection Against Lightening For Rotorcraft Rotor, the disclosure of which in its entirely is incorporated by reference thereto herein.

The invention relates to a blade with shielding for enhanced protection against lightning for a rotorcraft rotor, and particularly for a helicopter tail rotor.

The invention relates to a blade of known type, comprising a composite structure, essentially in composite material with a synthetic matrix and inorganic and/or organic reinforcing fibres, producing a profiled main blade section delimited between a suction face surface and a pressure face surface which extend, chordwise (in the direction of the chord of the blade), between a leading edge and a trailing edge and, spanwise (in the direction of the span of the blade), between one end of said main blade section, commonly known as the tip, and a blade root which extends the opposite end of said main blade section and which includes means for attaching the blade, for linking it to a rotor hub. The end tip may, on the one hand, have a shape in plan which is in continuity with respect to the main blade section or may evolve and, on the other hand, constitute a structural element which is either incorporated into the continuity of the structure of the main blade section or is attached and distinct from the structure of the main blade section, assembly then being provided by mechanical means or by gluing around appropriately sized reinforcing members.

The blade attachment means may connect this blade directly to the rotor hub or indirectly to this hub via a linking member, commonly known as a cuff, itself connected to the hub by means of retention and articulation thereon.

U.S. Pat. No. 4,944,655 describes a propeller blade in fibre-reinforced plastic comprising a profiled main blade section intended to be attached by a blade root to a propeller hub including metallic parts, the blade also comprising a system for combined protection against erosion, icing and lightning.

This system for combined protection includes shielding for protection against lightning, which comprises Ia protective metal glove made of a material which is especially electrically conducting, for example of titanium or titanium alloy and which is fixed to the leading edge and to the parts adjacent thereto of the suction face and pressure face surfaces of the main blade section, in order to provide protection of the leading edge, and a cover for protecting the blade tip, at the end of the main blade section which is opposite to the one which is extended by the blade root, this cover also being metallic and electrically conducting, and extending over the entire chord of the end of the blade tip which it covers, being connected with the glove for protecting the leading edge in such a way as to be in electrical continuity with this glove. Finally, on the blade root or near the latter, the shielding for protecting the propeller blade against lightning comprises electrically conducting means, such as cables and/or tapes of metal to provide electrical continuity between the glove for protecting the leading edge and the metallic and electrically conducting parts of the hub, in order to earth the shielding for protection against lightning.

The problem underlying the invention is of enhancing the lightning resistance of the rotor blades of rotorcraft, such as helicopters, and in particular of blades of composite structure of the type defined hereinabove, especially tail rotor blades, so as to meet the stricter requirements of new standards now in force which cannot be met via the conventional means used in the blades of such rotors for allowing lightning current to pass, namely electrically conducting foils or thin metal tapes, for example of copper, incorporated into the composite structure of the blades and extending from the tip to the root of the blades.

The object of the invention is to achieve the desired improvement in the behaviour of helicopter rotor blades in lightning by applying the teachings of U.S. Pat. No. 4,944,655 and by improving the shielding means proposed in this patent on helicopter rotor blades in such a way as to make these blades more tolerant to high strength lightning currents (approximately 3 times the strength of the lightning current taken into account in the standards previously adopted in producing such blades). According to the observations in use, these currents, statistically speaking, usually strike the blades and more particularly the tips at the ends of the blades on account of their shape which naturally protrudes beyond the aircraft as a whole.

In particular, the object of the intention is to improve the shielding known from U.S. Pat. No. 4,944,655 in such a way as to improve the residual strength after a lightning strike, to allow normal flight to be continued, and the quality of the protection provided by the shielding with regard to the centrifugal forces acting on it as the rotors rotate as well as with regard to the phenomena of detachment which may arise between the shielding and the composite structure of the blade owing especially to phenomena of repulsion developing between these elements when such a blade is struck by lightning.

Another object of the invention is to ensure the strength and the quality of protection, as mentioned hereinabove, using means which avoid or minimize damage which may be suffered by the composite structure of the blade in the event of it being struck by lightning.

To this end, the blade with shielding for enhanced protection against lightning according to the invention, having a composite structure and being of the type mentioned hereinabove, is equipped with shielding for protection against lightning which comprises:

a glove for protecting the leading edge, said glove being metallic, electrically conducting, and comprising a suction face arm and a pressure face arm which are adjacent along the leading edge and fixed to underlying parts of the suction face and pressure face surfaces, a cover for protecting said blade tip, said cover covering at least the end of said blade tip and being metallic, electrically conducting, and comprising a suction face arm and a pressure face arm which extend over the entire end chord of said blade tip and which are applied to underlying parts of said suction face and pressure face surfaces respectively, in the region of the tip, the cover being connected with electrical continuity to said glove, and electrically conducting means on said blade root intended to provide electrical continuity between said glove and electrically conducting means of said hub, for earthing said shielding, and is characterized in that said leading edge glove and said cover for the blade tip are produced as a single component, preferably made of titanium, aluminium, stainless steel or electroformed nickel sheet, which is fixed by said cover against at least the end face of said composite structure in the region of said blade tip with the aid of fixing means which are at least in part electrically conducting.

Producing the cover and the glove as a single component improves the resistance of the cover against being torn out under the effect of centrifugal forces, this resistance to being torn out being further improved by the fixing means fixing this cover against at least the end face of the tip of the blade. In addition, producing the glove and the cover as a single component in this way requires no electrical connection or earthing between glove and cover, which makes it possible to avoid the risk of static breakage and fatigue of the connection provided between these two components in the aforementioned patent. This also avoids the addition of electrically conducting intermediate components of the linking piece type which are liable to detach and be thrown out during flight. Furthermore, making the single component forming the glove and the protective cover in bent stretched titanium, aluminium, or stainless steel sheet, or alternatively nickel sheet obtained by electroforming is advantageously simple and ensures good flow of lightning current as well as good protection against erosion.

To ensure good cohesion of the metallic shielding with the composite structure of the blade at the same time as good protection of this composite structure at the end face of the tip, the fixing means comprise at least one adhesive which may be an electrically conducting adhesive, such as a glue, a resin on film, supported or otherwise type, which glues the cover against at least part of the end face of the blade tip and/or part of at least one of said suction face and pressure face surfaces of the composite structure, said glove also adhering, by glueing, to said composite structure, the suction face and pressure face arms of the cover preferably being glued over their entire surface to the underlying parts of the suction face and pressure face surfaces of the composite structure.

However, the fixing means advantageously additionally comprise mechanical means having protruding shapes, such as screws and rivets.

Thus, these mechanical fixing means provide the strength and the quality of protection in the event of detachment at the end of a blade, which gives the gluing provided between the composite structure of the blade and the single metallic component forming glove and cover a fail-safe nature. It should be noted that the conducting nature of the glue is not necessarily advantageous. The use of a dielectric glue prevents the lightning current from passing through the glue along the span, whereas conductive gluing improves the connection as regards the flow of lightning current while providing better electrical contact between the metallic components forming the shielding and is advantageously supplemented by screwing or riveting in order further to improve the connection between the protection and the blade and the flow of lightning current. By contrast, to avoid the passage of current through the composite coverings of the carbon type for example, that is to say coverings deemed to be electrically conducting, it is preferable to insulate these from the shielding, in order to protect them by using a non-conducting glue. Furthermore, the use of mechanical fixing means having protruding shapes allows these means, on account of their shapes, to constitute predetermined points by which lightning can strike or exit, so that these means protect the surrounding composite structure of the blade, this being all the more the case if these mechanical fixing means are earthed via the cover and the glove. This results in excellent protection against damage which may be suffered by the composite structure surrounding the mechanical fixing means in the event of it being struck by lightning.

Furthermore, it is known that helicopter rotor blades are often equipped, at the blade tip, with screws fixed into the end face of the blade tip, close to the leading edge, and which in themselves constitute balancing and/or dynamic-adjustment weights and/or are used to close casings, housings or cavities formed in the blade tip and intended to contain balancing and/or dynamic adjustment weights.

Advantageously, in a blade according to the invention, advantage is taken of the presence of such screws, and the mechanical means for fixing the cover against at least the end face of the blade tip comprise at least one such balancing screw and/or screw for closing the housing of at least one balancing and/or dynamic adjustment weight, this screw being screwed into a region of said end face of the blade tip which is closer to the leading edge than to the trailing edge. The cover may comprise not only suction face and pressure face arms, but also an electrically conducting end flange connecting the suction face and pressure face arms, and which extends across the entire section of the end face of the blade tip and is fixed against this face using the balancing screw or screws. However, this embodiment requires the dimensions of the blade and of the cover to be very accurate to ensure correct mating and bonding together of the components. In a simplified embodiment of the blade according to the invention, the screw or each screw, which may be a balancing screw, may fix against the end face of the blade tip at least one cover flap which extends at least one of the suction face and pressure face arms of said cover and is bent with respect to said suction face and pressure face arms of the cover.

In an intermediate alternative form, the cover comprises, for connecting its suction face and pressure face arms, an electrically conducting partial end flange, in electrical continuity with the suction face and pressure face arms of the cover and extending over part, which is adjacent to the trailing edge, of the section of the end face of the tip.

Such a partial flange, which is metallic and strong, may be produced simply in various ways: using at least one flap extending one of the suction face and pressure face arms of the cover and bent against the end face of the tip, in its part adjacent to the trailing edge, the flap also being fixed to the other of the suction face and pressure face arms of the tip by an electrically conducting connection, for example one achieved by welding. The partial end flange may also comprise a double flap extending one of the suction face and pressure face arms of the cover, and of which one part is bent against the end face of the tip, in its part adjacent to the trailing edge, while the other part of the flap is cranked and fixed in an electrically conducting way, for example using rivets, against another flap which extends the other of the suction face and pressure face arms of the cover and which projects, in the direction of the span, beyond the end face of the blade tip.

Whether the end flange is complete or partial, it makes it possible to improve the lightning protection while substantially respecting the integrity, in the direction of the span, of the composite structure of the blade, and that of the suction face and pressure face arms of the cover itself.

The cover may be rendered integral with the composite structure of the blade with the aid of a mechanical anchoring which can be added to or substituted for fixing using at least one balancing screw and which comprises at least one thin component in the form of a fin, which is electrically conducting, secured to the composite structure which it extends as a projection, in the direction of the span, towards the outside of the blade tip.

If the cover includes an electrically conducting at least partial end flange in electrical continuity with the suction face and pressure face arms, then it is advantageous for this flange to be pierced with at least one slot through which there passes at least one conducting fin, of which a portion which projects outside the flange is bent at least in part against the flange, preferably half of this portion being bent towards the suction face arm and the other half towards the pressure face arm of the cover, so as to keep the flange applied against the end face of the blade.

If the cover has no flange, but if its suction face and pressure face arms are each extended by one respectively of at least two opposed lugs, then these lugs can be bent against the end face of the blade tip and their free end parts cranked and fixed, by gluing, preferably conductive gluing and/or riveting or screwing, against two opposed faces of at least one conducting fin.

One advantage of this bonding, preferably glued and riveted, incorporating at least one non-bent conducting fin which remains protruding with respect to the end of the blade is that the metal protrusion thus achieved with the parts of lugs fixed to the fin constitutes a point at which the lightning is encouraged to enter or to exit, and which thus protects the adjacent composite coatings from a direct lightning strike without in any way disturbing the aerodynamic flow because this protrusion is placed towards the trailing edge rather than towards the leading edge of the blade. This protrusion may, in addition, serve as a reference marking point for setting the "track" or dynamic setting of the rotors.

In addition, the two previous alternative forms are advantageously compatible with the cover being mounted on the composite blade by translation in the longitudinal direction (in the direction of the span) of the cover shifted towards the blade root. These alternative forms also make it possible to have mechanical anchoring of the cover on the blade in the case of a thin blade tip face, with a short chord, in which a screw at the end cannot be fitted, so that the hatch for access to the balancing weights is arranged, for example, on the suction face.

For the strength and quality of protection afforded by the cover to be ensured, in the event of detachment from the blade tip over the entire chord thereof, the mechanical fixing means advantageously also comprise at least one rivet fixing at least one of the suction face and pressure face arms of the cover against at least one of said suction face and pressure face surfaces in the region of the blade tip, in a region near the trailing edge and/or in a region near the leading edge.

To improve the passage of the lightning current through the cover, towards the glove and through the latter, it is furthermore advantageous for at least one, but preferably each of the suction face and pressure face arms of the cover to have one or more of the following geometric features:

this arm has a dimension and/or material section in the direction of the span which is larger in the region near the leading edge than in the region near the trailing edge and/or which is not substantially smaller, in its region near the leading edge, than the dimension and/or material section, in the direction of the chord, of the adjacent region of the corresponding suction face or pressure face arm of the glove, this arm has a dimension and/or material section, in the direction of the span, which reduces substantially progressively from a region near the leading edge to a region near the trailing edge, then which increases in a region directly adjacent to the trailing edge and as far as the latter, so as to be fixed by at least one rivet in this region near the trailing edge, this arm has, in its region near the leading edge, an edge extending over the corresponding suction face or pressure face surface and which connects via a concave part, with a blend radius, to the corresponding edge of the corresponding suction face arm or pressure face arm of the glove, this arm has, at least in its region near the leading edge, a thickness or developed transverse section which is at least equal to or greater than that of the corresponding suction face or pressure face arm of the glove in its region adjacent to the cover, and this additionally improves the resistance to erosion of the cover which, in rotation, is exposed to a relative velocity which is higher than the rest of the blade, the increased mass of the cover in this possibly thickened region also allowing the blade to be recentred with respect to its longitudinal pitch-change axis.

To make it easier to produce the single component for shielding forming glove and cover, this glove and cover may have suction face arms having substantially the same dimensions as their pressure face arms, in the direction of the chord and the span of the blade. The suction face arm and pressure face arm of the cover and the glove are then substantially symmetric with one another with respect to the chord plane of the blade.

However, to improve the strength of the protection provided by the shielding against phenomena of detachment developing between the shielding and the composite structure of the blade under the effect of repulsion forces which may act upon the suction face arm and pressure face arm of the glove and of the cover when the blade is struck by lightning, the glove and the cover advantageously have suction face arms which have dimensions which are different from those of their pressure face arms, in the direction of the chord (especially for the glove) and/or the span (especially for the cover) of the blade.

This is because it is known that the passage of an electrical current from the end of one arm of a conducting body which is bent into a U as far as the end of the other arm is accompanied by the appearance on the arms of repulsive forces of magnetic origin, resulting from the mutually-opposing components of the current vector and which are stronger, the higher the strength of the current and the smaller the radius of curvature of the body. The production of suction face and pressure face arms which are asymmetric with respect to the chord plane of the blade on the glove and on the cover for protection makes it possible to avoid local detachments from the composite structure of the arms of the glove and of the cover in their region near the leading edge and of the arms of the cover in their region near the trailing edge.

Thus, the pressure face arm of the glove is given a width in the direction of the chord which is greater than that of its suction face arm, if at the same time better resistance to erosion from rain and from sand is sought whereas a width, in the direction of the chord, of the suction face arm greater than the width of the pressure face arm of the glove gives better protection with regard to the probability of being struck by lightning when this region normally points towards the upstream outside of the aircraft, this protective cover advantageously being incorporated into the aerodynamic profile.

For the same reasons, the cover has a suction face arm and a pressure face arm, the dimensions of which are advantageously different at least in the direction of the span of the blade. Advantageously, the edges of the suction face and pressure face arms of the cover which extend over the suction face and pressure face surfaces evolve parallel to one another while at the same time being offset one with respect to the other in the direction of the span of the blade, following a line which is polygonal or has a continuous curvature.

The blade may have a straight tip, that is to say one whose end face extends, from the leading edge to the trailing edge in a plane substantially perpendicular to the longitudinal axis of the blade, generally situated in the front quarter of the chord starting from the leading edge but the blade may just as easily be equipped with a tip which is truncated over at least part of the chord, and has a leading edge which is inclined towards the trailing edge and towards the end of the tip, it being possible for the leading edge of the tip to be straight and to be swept back with respect to the leading edge of the main blade section, or alternatively to have a parabolic shape. In this case, the cover has an inclined leading edge of the same shape as that of the tip, and along which its suction face and pressure face arms are adjacent, and preferably secured together. A cover with a straight leading edge swept back at an angle has the advantage that its suction face and pressure face arms and, as the case may be, its lug(s) and/or flap(s) which can be bent with respect to the suction face and pressure face arms for fixing to the end face of the tip give(s) the cover a shape which can be developed which, at the end of the glove which itself has a shape which can be developed, makes it possible for the metal shielding to be produced in one single piece of sheet cut beforehand to the required dimensions and requiring just two successive bending operations, the first in order to form the suction face arm and pressure face arm of the glove and the second one to form the corresponding arms of the cover. The cover may be fixed by mechanical means to the tip as mentioned hereinabove by one or two screws which do not necessarily have to have a function of balancing or of closing balancing casings, and which fix at least one lug of the cover against the end face of the tip, as well as by one or more rivets fixing the suction face and pressure face arms of the cover on the underlying composite structure of the blade in regions near the leading and trailing edges.

The electrically conducting means of the blade root which provide electrical continuity between the glove and the hub may comprise, by analogy with the aforementioned conventional embodiments for protecting blades against lightning, at least one foil or metal tape and/or metal braid which is electrically conducting extending from the end of the glove closest to the blade root as far as a fixed point of the blade root and fixed thereto by gluing and/or riveting or screwing. However, in a blade according to the invention, it is advantageous for the electrically conducting means of the blade root to comprise a continuous extension of said glove which protects part of said blade root which comes into alignment with the leading edge as far as close to said blade attachment means, said extension of the glove being fixed at least at one point against said blade root by mechanical fixing means of the screw or rivet type and/or by an adhesive which may be conducting. These mechanical means of fixing the extension of the glove against the blade root thus ensure the strength and quality of the protection in the event of the shielding becoming detached in the blade-rooting area.

When the means of attaching the blade to the hub or to a member for linking to the hub comprise, on the blade root, at least one metallic and electrically conducting attachment bushing, and more commonly two parallel bushings, then according to an alternative form, said continuous extension of the glove may advantageously extend as far as being in direct connection with the attachment bushing or bushings. This makes the presence of metallization pads and/or braids which are used in the conventional shielding of blades against lightning unnecessary.

For other types of blade attachment, such as fork, torsion blade, mono-winding, not specifically described because they are well known, a similar continuous extension is advantageously produced. This conducting extension may be associated with or replaced by metallizing foil or braid, good electrical continuity between the foil or the braid and the glove being provided by conducting gluing associated with riveting or screwing or some other mechanical fixing means so as to avoid any repulsion phenomenon. Likewise, the material sections of the various conducting components are dimensioned so as to keep optimum flow of electrical charges with the minimum of Joule-effect losses which would cause heating and local detachments.

Advantageously also, for the lightning to enter or to exit in such a way as to protect the composite structure in the region of the blade tip it is advantageous for the cover to have a trailing end which protrudes projecting beyond the trailing edge of the blade, in the same way as for the flap so as to produce a point encouraging the lightning to enter or to exit thereby.

When the reinforcing fibres of the composite structure of the blade comprise carbon fibres, it is furthermore made advantageous for the blade to comprise, at least between its main blade section and the leading edge glove, an underlying glove, preferably a dielectric one, such as a composite with synthetic matrix and glass reinforcing fibres which advantageously insulates the leading edge glove from the carbon-fibre composite material so as to take account of the electrically conducting nature of these fibres which makes any composite containing them particularly sensitive to damage by lightning.

Figure 6:
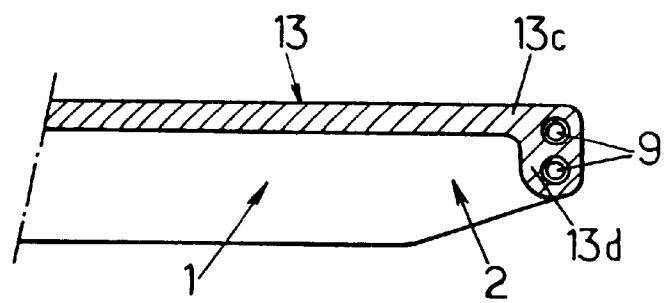
Figure 7:
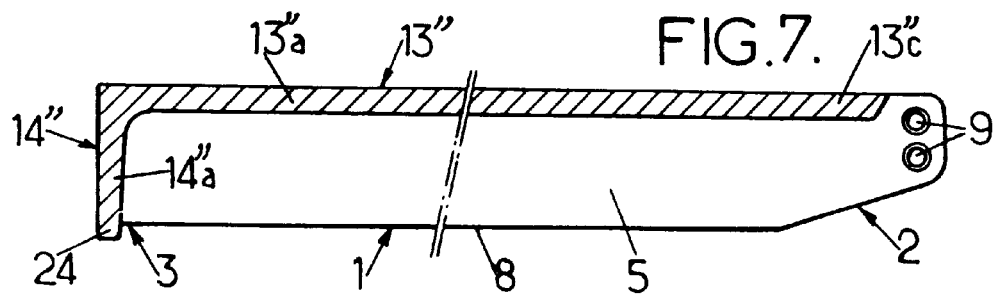
Figure 13:
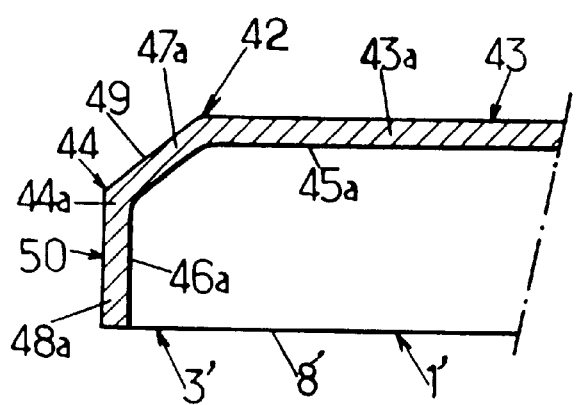
Figure 9:
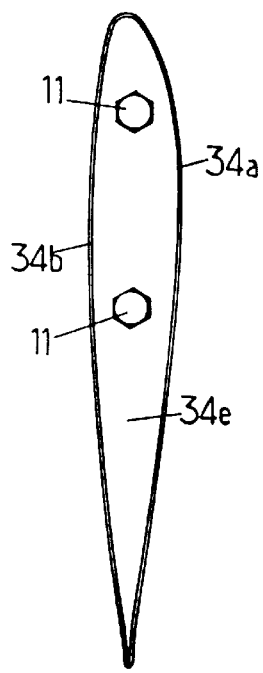
Figure 8:
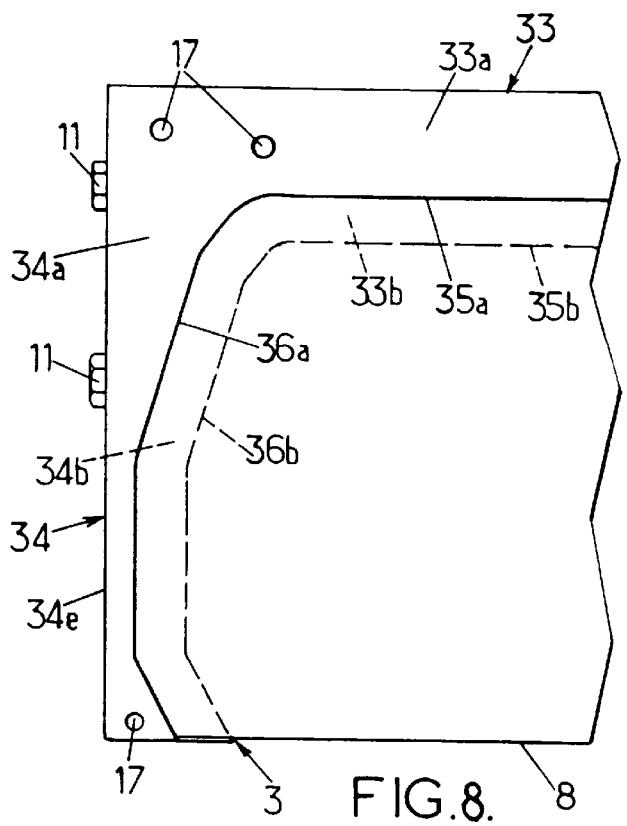
Figure 10:
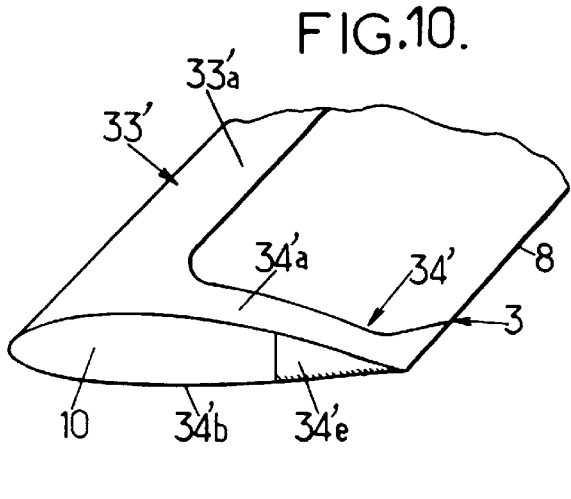
Figure 11:
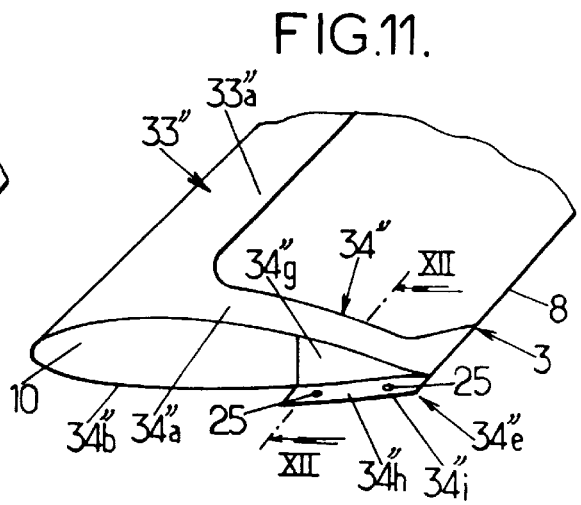
Figure 12:
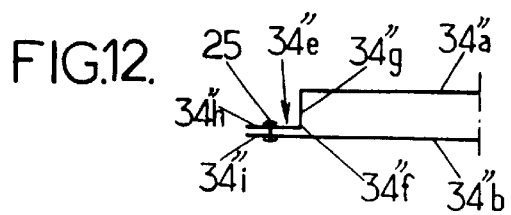

Further advantages and features of the invention will emerge from the description given hereinbelow without implied limitation, of embodiments described with reference to the attached drawings in which:

FIG. 1 is a diagrammatic plan view of a tail rotor blade with shielding for protection against lightning, FIG. 2 represents in side elevation the end of the tip of the blade of FIG. 1, on a larger scale, FIG. 3 is a view similar to FIG. 1 for a first alternative embodiment, FIG. 4 represents partially, in plan and on a larger scale, just the blade tip of a second alternative form of blade, with a straight end, FIG. 5 is an exploded diagrammatic section on V—V of FIG. 4, FIG. 6 represents diagrammatically and partially in plan just that part of a third alternative form of blade which corresponds to the blade root and to an adjacent portion of the main blade section, FIG. 7 represents diagrammatically in plan, a fourth alternative embodiment, FIGS. 8 and 9 are views similar respectively to FIGS. 4 and 2 for a fifth alternative form of blade, FIGS. 10, 10a, 11 and 11a are partial views in perspective of four alternative forms of the blade of FIGS. 8 end 9, FIG. 12 is a diagrammatic view in part section on XII—XII of FIG. 11, FIG. 13 is a partial and diagrammatic plan view of another alternative form of blade with truncated tip, FIG. 14 is a diagrammatic plan view of a piece of sheet precut to the dimensions of a shielding which can be developed for a blade with swept-back tip, and FIG. 15 is a view similar to FIG. 14 of the shielding sheet bent to form the protective glove and cover.

The blade of FIGS. 1 and 2 is a helicopter tail rotor blade essentially consisting of a structure of composite material with a synthetic matrix (for example a thermosetting resin) reinforced with inorganic and/or organic (for example glass, carbon or aramid) fibres, forming a main blade section 1 which is profiled to the desired aerodynamic profile, extended, at one end intended to be fixed to a rotor hub, by a blade root 2 which, in this example, has a trapezoidal form in plan, while the opposite end of the main blade section 1 constitutes a blade tip 3. The composite structure of the blade, which forms its main blade section 1, and which can be extended more or less fully into the blade root 2, may be any known structure, for example a mono- or multi-spar structure with rovings of unidirectional fibres agglomerated by an impregnation resin, and interacting with a suction face surface 5 and a pressure face surface 6 which consist of stratified coverings of layers of fibres agglomerated with resin (for example fibre fabrics or webs of fibres), so as to constitute a single-space or multi-pocket structure which may be filled, between the spar or spars and the stratified pressure face and suction face coverings, with filler bodies made in synthetic foam.

FIG. 1 shows that the profiled main blade section 1 of the blade has a form in plan which is substantially rectangular so that the leading edge 7 and trailing edge 8, between which the suction face and pressure face surfaces 5 and 6 extend chordwise, are substantially mutually parallel.

The long base of the right-angled trapezium shape which the blade root 2 makes in plan view is adjacent to the main blade section 1 and in this region has a chord equal to the substantially constant one of the main blade section 1 except in the region of the blade tip 3 where the chord reduces slightly in value. On the same side as its short base, that is to say on the side intended to point towards the hub of the rotor, the blade root 2 has blade attachment means which consist (FIGS. 1, 3, 6 and 7) of two metallic and electrically conducting bushings 9 which are parallel and pass through the blade root 2 in its thickness at right angles to the plane of FIG. 1. These two bushings 9 make it possible, in a known manner, to attach the blade with the aid of two pins which pass through them, for example in a radially outer (with respect to the axis of rotation of the hub) end clevis of a member for linking the blade to the hub, which member may, in a known manner, consist in its central part of a cuff and include a radially inner end part, also in the form of a clevis,. connected to the hub by retaining and articulating means such as a laminated spherical stop according to a well-known method of mounting which need not be described or represented further.

Other known types of blade attachment (fork, torsion blade, mono-winding, etc.) are compatible with the fitting of a glove and of an end cover as described hereinbelow for protecting the blade against lightning.

In a way which is also known, the structure of the blade has, in the blade tip 3, casings or housings (like those represented at 23 in FIG. 4) for balancing and/or dynamic adjustment weights which open into the end face 10 (see FIG. 2) of the blade tip 3, for the insertion or removal of said weights, and which are closed by two screws 11, themselves constituting balancing weights which are screwed into that half of this face 10 which is near the leading edge 7 More generally speaking, these casings can be situated either towards the suction face side or towards the pressure face side of the blade and may be accessible via access hatches in the suction face or in the pressure face of the profile at the end region.

The above-described blade is protected against lightning by shielding which essentially comprises one metallic and electrically conducting component 12 made of stainless steel or by stretching and shaping of a titanium sheet, or more generally any other metallic material which is a good conductor of electricity (electroformed nickel for example) and which is not fragile with respect to erosion by sand and by rain, which, at once, constitutes on the one hand, a glove 13 for protecting the leading edge 7 of the main blade section 1 and, on the other hand, a cover 14 covering the blade tip 3 and extending over the entire chord thereof. The glove 13, similar to conventional gloves for protecting the leading edge of blades against erosion and providing this erosion protection effectively, has a substantially U-shaped transverse section defined by a suction face arm 13*a* and a pressure face arm 13*b* which are adjacent to one another along the leading edge 7 covered by the glove 13 and which extend respectively over parts, adjacent to this leading edge 7, of the suction face surface 5 and pressure face surface 6 of the main blade section 1, to which surfaces the glove 13 is secured by gluing.

The arms 13*a* and 13*b* have substantially the same width, measured in the direction of the chord and in the direction of the span despite the asymmetry of the cover 14, as described hereinbelow, so that the arms 13*a* and 13*b* of the glove 13 are substantially symmetric to one another with respect to the chord plane of the blade.

The cover 14 which covers the blade tip 3 as far as the trailing edge 8 comprises a suction face arm 14*a* which extends the suction face arm 13*a* of the glove 13 of the leading edge in the direction of the span and especially in the direction of the chord, with a shape in plan which is substantially trapezoidal. The cover 14 also comprises a pressure face arm 14*b* which in a similar way extends the pressure face arm 13*b* of the glove 13, being substantially of the same trapezoidal shape but broader, in the direction of the span and starting from the end face than the suction face arm 14*a*. The edges 16*a* and 16*b* pointing towards the blade root 2 of the suction face arm and pressure face arm 14*a* and 14*b* of the cover 14 connect respectively to the edges 15*a* and 15*b* extending over the suction face surface 5 and pressure face surface 6 of the suction face and pressure face arms 13*a* and 13*b* of the glove 13 in a concave part the concavity of which pointing towards the trailing edge 8 and rounded with a blend radius. The edges 16*a* and 16*b* of the arms 14*a* and 14*b* of the cover 14 are, outside of their concave part for connection with the edges 15*a* and 15*b*, substantially straight and parallel to one another, being offset from one another in the direction of the span of the blade owing to the fact that the pressure face arm 14*b* is broader in the direction of the span than the suction face arm 14*a* at every point taken along the length of the chord. Each of the arms 14*a* and 14*b* of the cover 14 has a width in the direction of the span which is greater than the width in the direction of the chard of the arm 13*a* or 13*b* of the glove 13 to which it is connected, in its region near the leading edge 7 in order to make it easier for the lightning current to pass in this region in the direction of the span as in the direction of the chord. Furthermore, each arm 14*a* and 14*b* has a width in the direction of the span which reduces progressively from its region near the leading edge 7 as far as the trailing edge 8. However, in their region near the trailing edge, the arms 14*a* and 14*b* keep sufficient width, in the direction of the span, for it to be possible for each of the arms 14*a* and 14*b* to be fixed to the underlying part of the composite structure of the blade by at least one and preferably two rivets 17.

As shown in FIG. 2, the cover 14 also comprises two lugs 14*c* and 14*d* which are in alignment, in the case of the first one 14*c*, with the middle region, in the direction of the chord, of the suction face arm 14*a* of the cover 14 and, in the case of the second one 14*d*, with the region near the leading edge 7 of the pressure face arm 14*b* of the cover 14, these two lugs 14*c* and 14*d* being bent with respect to these arms 14*a* and 14*b* and applied against the end face 10 of the blade tip 3 to which each of the two lugs 14*c* and 14*d* is fixed by one of the two balancing screws 11 respectively. Thus, the lugs 14*c* and 14*d* of the cover 14 are in direct contact, and therefore in electrical continuity, with these metallic and electrically conducting screws 11, the heads of which project outside the end face 10 of the blade tip 3 and the shanks of which are engaged in the surrounding composite structure of the main section 1 of the blade.

Before the screws 11 and rivets 17 are fitted, the shielding 12 is glued hot, or alternatively cold or warm, to the composite structure of the blade either at the same time as the matrix of this composite structure is being polymerized, using a co-baking operation, or after this polymerization. The cohesion between the cover 14 and the blade tip 3 is ensured by gluing the arms 14*a* and 14*b* against the suction face and pressure face surfaces 5 and 6, and its lugs 14*c* and 14*d* against the end face 10 of the tip 3.

The screws 11 and rivets 17 supplement the fixing of the cover 14 on the composite structure of the blade and thus ensure the strength and quality of the metallic protection of the blade tip 3 in the event of detachment, in this region, between the cover 14 of the metallic component 12 and the composite structure of the blade, whether this detachment be the result chiefly of centrifugal and/or aerodynamic forces during rotation of the rotor or of the blade being struck by lightning, developing repulsive forces on the arms 14*a* and 14*b* of the cover 14. As the arms 14*a* and 14*b* are asymmetric owing to their different widths, in the direction of the span, the widest pressure face arm 14*b* is less affected by these repulsive forces, and the cover 14 is relatively well protected against detachment of its arms 14*a* and 14*b*. Thanks to the lugs 14*c* and 14*d* as well as to the suction face and pressure face arms 14*a* and 14*b* of the cover 14, the metallic and electrically conducting screws 11 and rivets 17 are earthed, in order to avoid the damage that may be suffered by the surrounding composite structure surrounding these screws 11 and rivets 17 in the event of a lightning strike, the lightning current being led away by the cover 14 and the glove 13, then towards the hub by the means described hereinbelow. It should be noted that owing to their protruding shapes, the screws 11 and rivets 17 constitute predetermined points for the lightning to strike or to exit, and thus protect the surrounding composite structure of the blade.

The shielding consisting of the single metallic component 12, constituting the glove 13 and the cover 14, as well as the screws 11 and rivets 17, all the elements of which are electrically conducting elements, are earthed by an electrically conducting metallic tape 18 which extends over the suction face surface of the blade root 2 being secured, by one end 18*a*, to the end of the glove 13 on the blade root 2 side and fixed, by its other end 18*b*, and with the aid of a screw or a rivet 19, to the blade root 2 right by the attachment bushings 9 so that after the blade has been mounted in the clevis which takes the cuff for linking with the hub, the conducting tape 18 is in electrical continuity via its end 18*b* with the metallic and electrically conducting components of the cuff for linking to the hub and of the hub. A conducting tape such as 18 can be mounted in a similar way on the suction face surface or on the pressure face surface of the blade root 2.

The alternative form of FIG. 3 can be distinguished from the example described hereinabove with reference to FIGS. 1 and 2 only by the means providing the earthing of the shielding in the region of the blade root 2. For this purpose, the conducting tape 18 of FIG. 1 is omitted and advantageously replaced by a continuous extension 13*c* of the leading edge glove 13 which extends over the leading edge of the blade root 2 in alignment with the leading edge of the main blade section 1 and in such a way that the end of the glove 13 on the side opposite to the cover 14 is fixed right by the two attachment bushings 9 by a screw or a rivet 19 into each of the suction face and pressure face arms of the extended glove 13. These screws or rivets ensure the strength and quality of the metallic protection in the region of the blade root 2 in the event of detachment in this region between the extension 13*c* of the glove 13 and the underlying structure, at least partially composite, of the blade root 2.

According to the other alternative form of FIG. 6, the extension 13*c* of the glove 13, which covers the entire leading edge of the blade root 2 is extended itself, on the suction face side, by an end plate 13*d* and, preferably also on the pressure face side,. by a similar end plate (not represented), and the two plates such as 13*d* are in direct contact with the attachment bushings 9. These bushings 9 thus play a part in earthing the shielding for lightning protection. The passage of lightning current from the cover 14 is thus ensured by the glove 13 and its extension 13*c* of the blade root 2, then by the plates such as 13*d*, the attachment bushings 9, the pins fixing these bushings into the radially outer clevis of the cuff for linking to the hub, and then by this cuff as far as the metallic parts of the hub.

The alternative form of FIGS. 4 and 5 can be distinguished from the examples described earlier by several differences of unequal importance. The most important is that the glove 13' has a pressure face arm 13'*b* which is wider, in the direction of the chord, than its suction face arm 13'*a*. The rear edge 15'*b* of the arm 13'*b* which is extended by a rounded portion for attaching to the internal edge 16'*b* of the pressure face arm 14'*b* of the cover 14' is therefore offset towards the trailing edge 8 with respect to the rear edge 15'*a* of the suction face arm 13'*a*, this rear edge 15'*a* being attached, as in FIG. 1, by a rounded portion to the internal edge 16'*a* of the suction face arm 14'*a* of the cover 14', and the edge 16'*a* being parallel to the edge 16'*b* but offset in the direction of the span towards the end of the blade.

In this alternative form the asymmetry with respect to the chord plane of the blade between the suction face arms 13'*a* and 14'*a* and pressure face arms 13'*b* and 14'*b* of the glove 13' and of the cover 14', resulting from their different dimensions in the direction of the chord and/or in the direction of the span of the blade, is a particularly favourable feature, the consequences of which are described hereinbelow with reference to FIG. 5 for the glove 13'.

In the event of the blade being struck by lightning, if the lightning current travels from one of its rear edges 15'*a* and 15'*b* towards the other, passing through the leading edge of the glove 13', then repulsive forces of magnetic origin resulting from the mutually opposing components of the current vector, and which are stronger, the higher the strength of the current and the smaller the radius of curvature of the glove 13' appear on the arms 13'*a* and 13'*b*. These repulsive forces tend to move the arms 13'*a* and 13'*b* apart, and therefore to tear them off the composite structure denoted overall as 20 in FIG. 5, and to which these arms 13'*a* and 13'*b* are glued, as mentioned hereinabove. By contrast, when the lightning current travels from the leading edge of the glove 13 along each arm 13'*a* and 13'*b* towards the rear edge 15'*a* or 15'*b* of this arm, then the forces which are developed on the arms 13'a and 13'b tend to pull them closer together, which produces an effect favourable to the cohesion of the glove 13' on the composite structure 20.

When the two arms of the glove have the same width, in the direction of the chord, the repulsive forces developed in the aforementioned case produce an effect which is unfavourable to the cohesion of the glove on the composite structure, because they tend in preference to detach the pressure face and suction face arms of this glove.

By contrast, in FIG. 5, since one, 13'b, of the arms of the glove 13' has a width (in the direction of the chord) which is greater than that of the other, 13'a, this gives a favourable region on the wider arm 13'b, this region being delimited between its rear edge 15'b and the projection on the arm 13'b of the rear edge 15'a of the other arm 13'a, thanks to which region the repulsive forces acting upon the unfavourable region delimited between the leading edge of the glove 13' and the rear edge 15'a or its projection onto the arm 13'b are not high enough to cause local detachment of the arms 13'a and 13'b, particularly of the wider arm 13'b.

In this embodiment, in which the pressure face arm 13'b is the wider one, the suction face arm 13'a is acted upon more than the pressure face arm 13'b, which simultaneously provides better resistance to erosion from rain and from sand.

As an alternative, it is of course possible to give the suction face arm 13'a a width greater than that of the pressure face arm 13'b. In this case, excellent adherence is obtained at the rear edge 15'a, which is furthest back towards the trailing edge, of the suction face arm 13'a, which is acted upon less than the pressure face arm 13'b, the great width of the suction face arm 13'a at the same time having the effect of providing better aerodynamic flow over the suction face of the blade if the cover 13' is attached to the original aerodynamic profile, but it may also constitute better protection against impact due to lightning coming from the outside upstream end of the aircraft.

The same phenomena arise on the cover 14', as in any case they do on the cover 14 of the alternative forms described hereinabove, on account of the asymmetry of the suction face and pressure face arms which are due to their difference in width in the direction of the span of the blade.

Another difference, also described with reference to FIG. 5, is that when the composite structure 20 of the blade comprises carbon reinforcing fibres which are electrically conducting while the synthetic matrix of the composite material is insulating, then a dielectric underlying glove 21 is advantageously placed under the leading edge glove 13' in order to insulate the composite structure 20 of the blade from its conducting leading edge glove 13'. In this case, the underlying dielectric glove or under-glove 21 may advantageously be made in composite material with the same synthetic matrix as the rest of the composite structure 20 of the blade and glass reinforcing fibres and have a suction face arm 21a and a pressure face arm 21b which are at least as wide, in the direction of the chord, as the suction face arm 13'a and pressure face arm 13'b respectively of the glove 13', the cohesion of the under-glove 21 with the composite structure 20 being ensured by polymerizing this structure 20.

When the composite structure of the blade has only glass or aramid reinforcing fibres which are not electrically conducting, then it is preferable to have such an under-glove made of dielectric material, in order to insulate the working covering of the blade from other necessary features or other equipment installed, such as blade de-icing equipment.

Another difference is that the pressure face arm 14'b of the cover 14' is, in its region near the trailing edge 8, wide enough (in the direction of the span) to be fixed to the underlying composite structure of the blade by three rivets 17, whereas the region of the suction face arm 14'a near the trailing edge 8 is fixed, for example, by two rivets 17, like in the previous examples. In addition, each of the suction face arm 14'a and pressure face arm 14'b is also fixed, in its front region, near the leading edge, to the underlying composite structure by another two rivets 17.

Finally, the suction face arm 13'a of the glove 13' may be connected, in the direction of the span of the blade, to the suction face arm 14'a of the cover 14' by a discontinuity 22 in the form of a ramp which diverges from the suction face surface 5 of the blade in the direction going from the glove 13' to the cover 14'. In the direction of the chord, this discontinuity 22 may extend along the entire width of the suction face arm 13'a of the glove 13'. In a way which is not represented, the pressure face arm 13'b of the glove 13' may connect in the same way to the pressure face arm 14'b of the cover 14' via a similar discontinuity. The discontinuity 22 corresponds to an increase in thickness of the cover 14' in its region near the leading edge. The increase in mass which results from this allows the blade to be recentred with respect to its longitudinal pitch-change axis XX in the front quarter in the direction of the chord starting from the leading edge. In addition, the cover 14' thus has better resistance to erosion, bearing in mind the fact that as it rotates it is exposed to a higher relative speed. This compensation may take place directly, as an alternative, by varying the positions of the weights inside the balancing housings or indirectly by incorporating a counterweight into the front structure of the blade (masses preferably being shifted from the back forwards). Either one of these devices makes it possible to get around the presence of a discontinuity which is unfavourable for aerodynamic performance.

As far as the rest is concerned, this alternative form again comprises the two balancing screws 11 closing the housings, represented diagrammatically as 23, for balancing weights and simultaneously fixing lugs 14'd and 14'c of the cover 14' against the end face of the blade tip, as described hereinabove with reference to FIG. 2. In the alternative form of FIGS. 4 and 5, the cover 14' thus has greater thickness than the glove 13', at least in that part of the cover 14' which is near the leading edge. However, this excess thickness may be exhibited along the entire chord of the blade tip by the suction face part and pressure face part 14'a and 14'b of the cover 14'.

A blade according to the alternative form of FIGS. 4 and 5, with shielding of which the glove 13' and the cover 14' have pressure face arms of larger dimensions than the suction face arms is particularly suitable for a conventional helicopter tail rotor of which the direction of rotation and the position, with respect to the rigid tail fairing or tail pylon supporting the rotor, are such that the pressure face of the blades points towards the outside with respect to the pylon, also covered with an electrically conducting metallic leading edge which is earthed to allow lightning current to pass.

The alternative form of FIG. 7 can be distinguished essentially from the preceding examples by the fact that the glove 13" and the cover 14" each have suction face and pressure face arms of the same dimensions in the direction of the chord and the span and, therefore are substantially symmetric with one another, and by the presence of a point via which lightning is encouraged to enter or to exit on the cover 14". In effect, the suction face and pressure face arms of this cover 14" are each extended and meet preferably projecting beyond the trailing edge 8 of the blade so as to produce a trailing end 24 of the cover 14". This trailing end 24 protrudes projecting beyond the trailing edge 8 of the blade so as to constitute said point at which the lightning is encouraged to enter or to exit. Although these are not represented, this alternative form also includes screws and rivets for fixing the cover 14" on the underlying part of the composite structure of the blade and, as in the alternative form of FIG. 4, the edge of the suction face arm 14"a of the cover 14", towards the inside of the blade, connects with the rear edge of the suction face arm 13"a of the glove 13" via a rounded concave part with a blend radius. The glove 13", still as a single component made of metal sheet with the cover 14", extends, in the direction of the span of the blade, with a continuous extension 13"c substantially like in the example of FIG. 3, which covers the leading edge of the blade root 2 as far as right by the attachment bushings 9.

In the alternative form of FIGS. 8 and 9, the suction face arm 34a and pressure face arm 34b of the cover 34 are joined together continuously from the leading edge to the trailing edge by an end flange 34e of the cover 34 (see FIG. 9). This flange 34e is in the same electrically conducting metal as the arms 34a and 34b and it extends against the entire section of the end face of the blade tip 3, the end part of which is thus completely covered by the cover 34. The flange 34e is fixed against the end face of the tip which it covers by two screws 11 which, like in FIGS. 2 and 4, may be balancing screws and/or screws for closing the housings of balancing or dynamic adjustment weights represented as 23 in FIG. 4. Here again we see that the straight rear edges 35a and 35b of the suction face arm 33a (the narrower one in the direction of the chord) and pressure face arm 33b (the broader one in the direction of the chord) of the glove 33 connect respectively with the internal edges 36a and 36b of the suction face arm 34a (the narrower one in the direction of the span) and pressure face arm 34b (the broader one in the direction of the span) of the cover 34 via concave parts with a blend radius. We also see that the contours of the inner edges 36a and 36b of the arms 34a and 34b of the cover 34 are parallel and offset with respect to each other in the direction of the span of the blade but, in this example, these internal edges 36a and 36b are not straight from the region of the leading edge to the trailing edge. These edges 36a and 36b consist of a succession of three substantially straight segments, the first of which, towards the rear edge 35a or 35b of the glove 33, is inclined so as to correspond to a rapid reduction in the width of the corresponding arm 34a or 34b, running along the direction of the chord towards the trailing edge. The second segment of the edges 36a and 36b is substantially parallel to the end flange 34e and thus delimits a portion of the arms 34a and 34b of constant width (in the direction of the span). Finally, the third segment in the region of the arms 34a and 34b which is directly adjacent to the trailing edge 8, is inclined in the direction which increases the width of the arms 34a and 34b as far as the trailing edge 8. This increase in width makes it possible, in those regions of the arms 34a and 34b which are near the trailing edge 8, to have enough material available for fixing these parts to the underlying composite structure of the blade using at least one rivet 17. Despite this increase in width close to the trailing edge 8, the arms 34a and 34b of the cover 34 are still wider in their region adjacent to the leading edge than in their region adjacent to the trailing edge and, close to the leading edge, these arms 34a and 34b have a width which is greater than the width (in the direction of the chord) of the suction face arm 33a and pressure face arm 33b of the glove 33 respectively. Thus, in the regions near the leading edge, the arms 34a and 34b can each be fixed to the underlying composite structure of the blade by two rivets 17.

The screws 11 and rivets 17 ensure good mating of the cover 34 on the blade tip 3, particularly on the end face and on the nearby regions of the leading edge and the trailing edge of this tip 3. In addition, these screws 11 and rivets 17 like in the preceding examples, provide electrical continuity with the various corresponding parts of the cover 34, supplementing the effects of the gluing also fixing the cover 34 on the blade tip 3.

In order not to have to produce the glove 33 and the cover 34 as a single piece with very precise dimensions, necessary for good mating and good gluing of this component on the composite structure of the blade, the full flange 34e of the alternative form of FIGS. 8 and 9 may be replaced by a partial flange, adjacent to the trailing edge, as in the alternative forms of FIGS. 10 and 11.

In FIG. 10, the partial end flange 34'e extends between the suction face arm 34'a and pressure face arm 33'b of the cover 34', being applied only against that part of the section of the end face of the tip 3 which is adjacent to the trailing edge 8 of the blade. This partial flange 34'e consists of a flap which, in this example, extends that part of the suction face arm 34'a which is adjacent to the trailing edge 8, and this flap 34'e is bent with respect to this arm 34'a so as to be applied against the rear part of the end face of the tip 3, the flap 34'e additionally being welded, along its edge opposite to the bent edge, to the pressure face arm 34'b so that the partial flange 34'e thus produced connects the suction face arm 34'a and pressure face arm 34'b together, being in electrical continuity therewith. As far as the rest is concerned, the arms 34'a and 34'b of the cover 34' have substantially the same shape as those of the cover 34 of FIG. 8, and each extends the corresponding suction face arm 33'a or pressure face arm of the glove 33' in the same conditions as in FIG. 8.

Figure 10A:
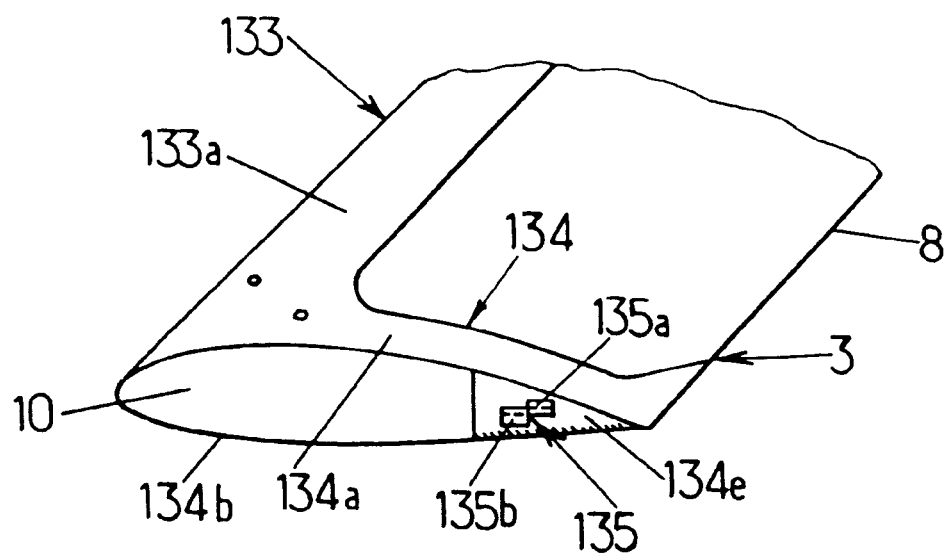

In FIG. 10a, the cover 134 is similar to the cover 34' of FIG. 10 insofar as it includes a conducting partial end flange 134e, in electrical continuity with the suction face arm 134a and pressure face arm 134b of the cover 134 to which the flange 134e is secured and between which arms it extends, the cover 134 being attached to the blade tip 3 and in electrical continuity with the leading edge glove 133 like in the preceding examples. The flange 134e may be constructed, like the one 34'e of FIG. 10, by a flap secured to the suction face arm 134a and bent against that part of the end face 10 which is adjacent to the trailing edge 8, the lower edge of this flap being welded to the edge of the pressure face arm 134b. The essential difference compared with the example of FIG. 10 is that the flange 134e is pierced with a slot which, when the cover 134 is mated with the tip 3, is passed through by a conducting metallic fin 135 secured to the composite structure of the blade and projecting outside the rear part of the end face 10 in the direction of the span. After the fin 135 has passed through the slot in the flange 134e and the cover 134 has been engaged on the tip 3 until the flange 134e is applied against the rear part of the end face 10, the portion of the fin 135 projecting outside the flange 134e is advantageously split longitudinally into at least two halves of which one 135a is bent back against the external face of the flange 134e towards the suction face arm 134a and the other 135b towards the pressure face arm 134b. As an alternative, the flange 134e may be full. Thus the cover 134 is anchored mechanically on the composite structure of the blade by the interaction of the fin 135 with the flange 134e.

The diagrammatic sectional view of FIG. 12 clearly shows the bent and riveted structure of the partial end flange 34"e of the alternative form of FIG. 11. This partial flange 34"e comprises a first flap 34"f which is double and extends the part, near the trailing edge 8, of the suction face arm 34"*a* of the cover 34". This first flap 34"*f* comprises a first part 34"*g* adjacent to the arm 34"*a* and which is bent against the rear part of the end face 10 of the blade tip 3 and a second part 34"*h* which is bent with respect to the first part 34"*g* to which it is adjacent, and the part 34"*h* is cranked back and applied against a second flap 34"*i* which extends the part which is nearby the trailing edge of the pressure face arm 34"*b* of the cover 34" beyond the end face 10 in the direction of the span. The second part 34"*h* of the first flap 34"*f* is then riveted, for example, using two rivets 25, against the second flap 34"*i*, so that a partial end flange 34"*e* of substantially z-shaped section is obtained, providing a stiffened connection between the suction face arm 34"*a* and pressure face arm 34"*b* and in electrical continuity with them. As far as the rest is concerned, we again see that the suction face arm 34"*a* and pressure face arm 34"*b* of the cover 34" have substantially the same shapes and connect with the suction face arm 33"*a* and pressure face arm respectively of the glove 33" in the same way as in the example of FIG. 8.

Figure 11A:
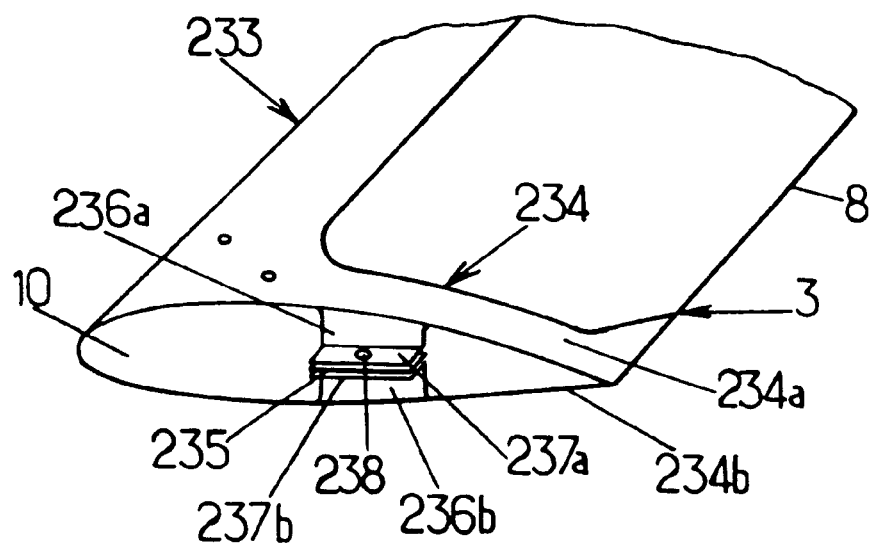

In the alternative form of FIG. 11*a*, we again find a conducting fin 235 secured to the composite structure of the blade and projecting in the direction of the span outside the end face 10. However, unlike the fin 135 of FIG. 10*a*, the fin 235 protrudes from the central part of the face 10 and extends substantially in the chord plane without being bent. Each of the suction face arm 234*a* and pressure face arm 234*b* of the cover 234 attached to the tip 3 and in electrical continuity with the leading edge glove 233, like in the preceding examples, is extended on the same side as the face 10 by respectively one of two opposed lugs 236*a* and 236*b*, of which one 236*a* is a suction face lug bent towards the pressure face arm 234*b* and against the face 10 and the free end part 237*a* of which is cranked back and applied against the upper face (in FIG. 11*a*) of the fin 235, while the pressure face lug 236*b* is bent towards the suction face arm 234*a*, against the face 10, and its free end part 237*b* is cranked back and applied against the lower face of the fin 235. The assembly formed by the fin 235 and the two cranked-back parts 237*a* and 237*b* is glued with an adhesive, preferably a conducting one, and riveted with at least one rivet 238 making the connection even more conducting. This assembly which protrudes beyond the end face 10 of the blade and provides mechanical anchoring of the cover 234 on the blade tip 3 constitutes a point at which lightning is encouraged to enter or to exit, this protecting the composite structure of the blade against direct strikes without too greatly disrupting the aerodynamic flow, because the fin 235 and the lugs 236*a* and 236*b* are placed closer to the trailing edge 8 than to the leading edge of the blade. This fin, when it remains protruding (that is to say outside the theoretical diameter of the rotor defined by the position of the end face of the tip with respect to the centre of the rotor) may serve as an optical identification mark when performing dynamic adjustment, known as "tracking" on the rotor.

A partial end flange, of the same type as the one in FIGS. 10, 10*a* and 11, is an attractive solution for a cover intended to cover a truncated blade tip along part of the chord, and therefore has a leading edge which is inclined towards the trailing edge and towards the end of the tip, whether this truncated tip be a parabolic tip or one which has a leading edge which is swept back with respect to the leading edge of the main blade section, because balancing screws are not always present.

A blade with swept-back truncated tip is partially and diagrammatically represented in FIG. 13. In this figure, the tip 3' at the external end of the main blade section 1' of the blade has, viewed in plan, the shape of a right-angled trapezium, the inclined side of which constitutes the leading edge of the tip 3' and is swept back by an angle which may be some 45°±15° with respect to the leading edge of the main blade section 1'. As in the preceding examples, dealing with blades with straight tips, a single metallic shielding component 42 simultaneously constitutes a leading edge glove 43 and a cover 44 for the blade tip 3'. In this example, the glove 43 and the cover 44 each have suction face and pressure face arms which are symmetrical, that is to say have the same dimensions in the direction of the chord and of the span of the blade.

However, each of the two arms of the cover 44, like the suction face arm 44*a*, comprises an inclined front part such as 47*a* and a straight rear part such as 48*a*. The two inclined front parts such as 47*a*, each swept back at the desired angle in line with the corresponding suction face arm 43*a* or pressure face arm of the glove 43 are secured together and adjacent to one another along the inclined leading edge 49 of the cap 44, this leading edge 49 directly covering the leading edge, which has the same shape, of the blade tip 3'. Each of the straight rear parts such as 48*a* which extends the corresponding inclined front part such as 47*a* towards the trailing edge 8' of the blade while being substantially perpendicular thereto, or inclined by a small angle (of some 3°) backwards and towards the blade root so as to remain inside the rotor diameter passing through the connection between the parts 48*a* or 48*b* and 49*a* or 49*b* so as to avoid erosion of a "right" face section, is separated from the other straight rear part by the profiled end face indicated diagrammatically by the arrow 50, of the blade tip 3'. Defined another way, the straight segments 47*a*, 47*b*, 48*a*, 48*b* and 49*a*, 49*b* may be replaced in an equivalent way by a curve.

To fix the cover 44 against this end face 50 of the tip 3', which face has a profiled section which is smaller than that of the main blade section 1' of the blade, it is possible to produce a partial flange with one bent and welded flap or with two flaps one of which is double, bent, cranked back and riveted to the other, as in FIGS. 10 and 11, to link the straight rear part 48*a* of the suction face arm 44*a* to the corresponding straight rear part of the pressure face arm, this partial flange being fixed to the end face 50 by conductive gluing and by mechanical means such as one or two screws, as in FIGS. 2 and 4, but which does not necessarily fulfil the function of closing a balancing casing, it also being possible for rivets to be used for fixing to the composite structure of the tip 3' the region near the trailing edge 8' of the straight rear parts such as 48*a* of the two arms of the cover 44. The inclined front parts such as 47*a* of this cover 44 are also fixed to the underlying composite structure of the blade tip 3' by conductive gluing and rivets in their region near the corresponding arms of the glove 43. In addition, each internal edge such as 46*a* of an arm such as 44*a* of the cover 44 has two concave parts with a blend radius, one of which connects the corresponding straight rear part such as 48*a* to the respective inclined part 47*a* and the other of which connects this latter part 47*a* to the rear edge such as 45*a* of the corresponding arm 43*a* of the glove 43.

The advantage of this embodiment is that the single shielding component 42 has a surface which can be developed, and can therefore be produced from a continuous piece of cut sheet by two successive bending operations the first of which, along the leading edge of the main blade section 1' and followed by stretching allows the glove 43 to be shaped and is followed by cutting the outlines of the glove 43, using a laser cutting process or the equivalent, cutting it to the required dimensions, and the second of which, which is along the inclined leading edge 49 of the cover 44, allows the shaping of the cover in its inclined front parts such as 47a, and allows its rear parts such as 48a to be positioned on each side of the end section of the blade tip 3' and in such a way that all that remains is for the two straight rear parts such as 48a to be joined together by a partial flange.

This advantage of the shielding component with a surface which can be developed for a blade with swept back truncated tip is retained even if the glove 43 and the cover 44 have asymmetric suction face and pressure face arms, as is represented as an alternative in FIGS. 14 and 15.

FIG. 14 represents the contours of the piece of sheet laid out flat before any shaping takes place. FIG. 15 represents the shielding component 42' shaped by two successive bendings of the piece of sheet of FIG. 14. In this FIG. 14, an elongate rectangular part corresponds to the glove 43' laid out flat. The upper and lower elongate rectangular parts of this developed glove 43' are adjacent along a straight axis 51 which is the axis of the first folding corresponding to the straight leading edge 51 of the glove 43' when shaped. These upper and lower elongate rectangular parts correspond respectively to the pressure face arm 43'b (the broader one in the direction of the chord) and suction face arm 43'a of the glove 43'. At its left-hand end in FIG. 14, the lower elongate rectangular part corresponding to the suction face arm 43'a is extended by a piece of sheet substantially in the form of an inclined "Y". The two branches of the Y, each substantially in the shape of a parallelogram, correspond to the straight rear parts 48'a and 48'b respectively of the suction face arm 44'a and pressure face arm 44'b of the cover 44', laid out flat. The stem of the Y consists of the two front parts 47'a and 47'b of the two arms 44'a and 44'b of the cover 44', these two front parts 47'a and 47'b being secured together and adjacent to one another along the second folding axis 49' which corresponds to the inclined leading edge of the shaped cover 44'. This second axis of bending 49' passes through the end of the first axis of bending 51 (leading edge of the glove 43') on the blade tip, as well as through the point where the two outer edges (52'a and 52'b) (in the direction of the span of the blade, but inside the branches of the Y before bending) of the rear parts 48'a and 48'b of the cover 44' meet. The "external" edge 52'a of the rear part 48'a has, projecting towards the inside of the Y, near to its trailing edge 53'a, a double flap 54'a with a part 55'a which is triangular and adjacent to the rear part 48'a and with a part 56'a which is trapezoidal and adjacent to the triangular part 55'a and pierced with an orifice for at least one fixing rivet. In register with this, the "external" edge 52'b of the other rear part 48'b has, projecting towards the inside of the Y, close to its trailing edge 53'b, a trapezoidal flap made of a single component 54'b. Each of the rear parts 48'a and 48'b also have, close to its trailing edge 53'a or 53'b, at least two holes for the passage of rivets. Likewise, at their end near the glove 43', the inclined front parts 47'a and 47'b each have at least two holes for the passage of rivets. By the first bending about the axis 51, the pressure face arm 43'b of the glove 43' is folded under its suction face arm 43'a in order to shape the glove 43', as shown in FIG. 15. Next, in a second folding about the axis 49', the pressure face arm 44'b of the cover 44' is folded under its suction face arm 44'a, and this shapes the inclined front part 47'b under part of the pressure face arm 43'b of the glove 43'. At the same time, the rear parts 48'a and 48'b are arranged substantially in line above one another. The part 55'a of the flap 54'a may be folded down perpendicular to the plane of FIG. 14, and the other part 56'a of this same double flap 54'a can then be bent so as to be applied against the flap 54'b of the other rear part 48'b. In that way, by fitting at least one rivet securing these two flaps, a partial flange is produced which connects the two rear parts 48'a and 48'b, which may be fixed by two rivets at their trailing edge 53'a and 53'b after placing on the basic composite structure of a blade with swept-back truncated tip, as in FIG. 13. Likewise, at least two rivets make it possible to fix the inclined front part 47'a in its region near the glove 43' on the underlying composite structure of the blade and at least two other rivets make it possible to fix the inclined front part 47'b on the portion that it covers of the pressure face arm 43'b of the glove 43' and in the underlying composition structure of the blade.

It is thus possible in a simple way to produce as a single component, shielding for enhanced protection against lightning with a leading edge glove and a blade tip cover each of which has asymmetric suction face and pressure face arms.

Such a cover may be produced for any blade end, including ends which have forms which cannot be developed (parabolic for example) by operations of pressing, electroforming and/or plastic stretching, the leading edge of the cover being manufactured using operations of bending (of a sheet or laminate of titanium for example), of stretch forming or punching, and cutting to the final contour.

What is claimed is:

1. A blade comprising shielding for enhanced protection against lightning for a rotorcraft rotor;

said blade comprising a composite structure of composite material, synthetic matrix and reinforcing fibers, said composite structure comprising a profiled main blade section delimited between a section face surface and a pressure face surface which extend, in a direction of a chord of the blade, between a leading edge and a trailing edge and, in a direction of a span of the blade, between a blade tip at one end of said main blade section and a blade root which extends an opposite end of said main blade section and which includes means for attaching the blade to a rotor hub;

said shielding for protection against lightning comprising:

a glove for protecting the leading edge, said glove being metallic, electrically conducting, and comprising a suction face arm and a pressure face arm which are adjacent along the leading edge and which are fixed to underlying parts of the suction face surface and the pressure face surface;

a cover for protecting the blade tip, said cover covering at least an end of the blade tip and being metallic, electrically conducting, and comprising a suction face arm and a pressure face arm which extend over substantially an entire end chord of the blade tip and which are applied to underlying parts of the suction face surface and the pressure face surface, respectively, in a region of the blade tip, being connected with electrical continuity to the glove, and electrically conducting means on the blade root for providing electrical continuity between the glove and electrically conducting means of said hub, for earthing the shielding, wherein the glove for the leading edge and the cover for the blade tip comprise a single component fixed by the cover against at least an end face of the composite structure in a region of the blade tip and fixing means which are at least in part electrically conducting wherein the glove and the cover have a suction face arm having dimensions, at least in a direction of a chord of the blade, which are different from dimensions of its pressure face arm.

2. A blade comprising shielding for enhanced protection against lightning for a rotorcraft rotor;

said blade comprising a composite structure of composite material, synthetic matrix and reinforcing fibers, said composite structure comprising a profiled main blade section delimited between a suction face surface and a pressure face surface which extend, in a direction of a chord of the blade, between a leading edge and a trailing edge and, in a direction of a span of the blade, between a blade tip at one end of said main blade section and a blade root which extends an opposite end of said main blade section and which includes means for attaching the blade to a rotor hub;

said shielding for protection against lightning comprising:

a glove for protecting the leading edge, said glove being metallic, electrically conducting, and comprising a Suction face arm and a pressure face arm which are adjacent along the leading edge and which are fixed to underlying parts of the suction face surface and the pressure face surface;

a cover for protecting the blade tip, said cover covering at least an end of the blade tip and being metallic, electrically conducting, and comprising a suction face arm and a pressure face arm which extend over substantially an entire end chord of the blade tip and which are applied to underlying parts of the suction face surface and the pressure face surface, respectively, in a region of the blade tip, being connected with electrical continuity to the glove, and electrically conducting means on the blade root in electrical continuity with the glove for earthing the shielding, wherein the glove for the leading edge and the cover for the blade tip comprise a single component fixed by the cover against at least an end face of the composite structure in a region of the blade tip and fixing means which are at least in part electrically conducting; and wherein the cover has a Suction face arm and a pressure face arm comprising different dimensions at least in a direction of a span of the blade.

3. A blade according to claim 2, wherein the fixing means comprise at least one adhesive, for glueing the cover against at least part of a member selected from the group consisting of the end face of the blade tip, at least one of said suction face surface and said pressure face surface of the composite structure, the glove, to the composite structure.

4. A blade according to claim 1, wherein said cover comprises an electrically conducting partial end flange said partial end flange connecting the suction face arm and pressure face arm of the cover with which each said arm said partial end flange is in electrical continuity, and extending over a part of the section of said end face which is adjacent to said trailing edge.

5. A blade according to claim 4, wherein said partial end flange comprises at least one cover flap which extends at least one of said suction face arm and said pressure face arm of the cover and is bent against said end face part adjacent to the trailing edge, said flap being fixed, to the other of said at least one of said suction face arm and said pressure face arm of the cover.

6. A blade according to claim 4, wherein said partial end flange comprises at least one double cover flap which extends at least one of said suction face arm and said pressure face arm of the cover, and of which a first part, adjacent to said at least one of said suction face arm and said pressure face arm of the cover is bent against said end face part adjacent to the trailing edge, whereas the second part of a double flap, adjacent to the first part thereof is cranked with respect to the first part of said double flap and fixed, against a second flap extending the other of said suction face arm and said pressure face arm of the cover and projecting in the direction of the span beyond said end face of the blade tip.

7. A blade according to claim 2, wherein said fixing means comprise mechanical means having protruding shapes, constituting predetermined points for lightning to strike or to exit, placed in electrical continuity with said cover.

8. A blade according to claim 7, wherein said mechanical fixing means comprise at least one rivet fixing at least one of said suction face arm and said pressure face arm of said cover against at least one of said suction face surface and said pressure face surface in a region selected from the group of regions consisting of a region of the blade tip, a region near the trailing edge and a region near the leading edge.

9. A blade according to claim 2, wherein the cover includes an electrically conducting at least partial end flange in electrical continuity with the suction face arm and the pressure face arm of the cover and pierced with at least one slot through which at least one electrically conducting fin secured to the composite structure of the blade and projecting in the direction of the span towards the outside of the blade tip passes, wherein a portion of the fin which projects outside the flange is bent, at least in part against said flange so as to keep the flange applied against the end face of the blade.

10. A blade according to claim 2, wherein the composite structure of the blade is extended, in the direction of the span and projecting outside the blade tip, by at least one electrically conducting fin secured to said composite structure and against two opposed faces of which there are fixed, cranked parts of at least two lugs bent against the end face of the blade tip and each secured, respectively, to one of the suction face arm and the pressure face arm of the cover.

11. A blade according to claim 2, wherein at least one of said suction face arm and said pressure face arm of the cover has at least one member selected from the group from the group consisting of a dimension and a material section in a direction of the span which is larger in a region near the leading edge than in a region near the trailing edge.

12. A blade according to claim 11, wherein at least one of said suction face arm and said pressure face arm of the cover has at least one member selected from the group consisting of a dimension and material section, in the direction of the span, which reduces substantially progressively from a region near the leading edge to a region near the trailing edge, and then which increases in a region directly adjacent to the trailing edge as far as the latter.

13. A blade according to claim 2, wherein at least one of said suction face arm and said pressure face arm of the cover has, in a region near the leading edge, at least one member selected from the group consisting of a dimension and material section in the direction of the span which is not substantially smaller than said at least one member selected from the group consisting of a dimension and material section in the direction of the chord of the adjacent region of a corresponding member selected from the group consisting of the suction face arm and the pressure face arm of the glove.

14. A blade according to claim 2, wherein at least one of the suction face arm and the pressure face arm of the cover has, in its region near the leading edge, an edge extending over a corresponding member selected from the group consisting of the suction face surface and the pressure face surface and which has a concave part, with a blend radius, substantially extended by a corresponding edge of the corresponding at least one member selected from the group consisting of the suction face arm and, the pressure face arm of the glove.

15. A blade according to claim 2, wherein at least one of the suction face arm and the pressure face arm of the cover has, at least in its region near the leading edge, a developed transverse section which is at least equal to that of the corresponding at least one member selected from the group consisting of the suction face arm and the pressure face arm of the glove in its region adjacent to the cover.

16. A blade according to claim 2, wherein the glove and the cover have a suction face arm and a pressure face arm which have substantially identical dimensions, at least in a direction of a chord of the blade.

17. A blade according to claim 2, wherein edges of the suction face arm and the pressure face arm of the cover which extend over said suction face surfaces and said pressure face surfaces evolve parallel to one another but are offset one with respect to the other in the direction of the span of the blade, following a line selected from the group consisting of a line forming a polygon and a line forming a curved line.

18. A blade according to claim 2, wherein the blade tip is truncated along at least part of the chord and has a leading edge inclined towards the trailing edge and towards the end of the blade tip, wherein the cover has an inclined leading edge of a substantially same shape as that of the blade tip and along which its suction face arm and pressure face arm are adjacent and secured together.

19. A blade according to claim 2, wherein said electrically conducting means of said blade root, in order to provide electrical continuity between the glove and the hub, comprise at least one member selected from the group consisting of one tape and a braid which is metallic and electrically conducting extending from one end of said glove which is closest to said blade root as far as a fixed point of said blade root and fixed thereto.

20. A blade according to claim 2, wherein said electrically conducting means of said blade root, in order to provide electrical continuity between the glove and the hub, comprise a continuous extension of said glove which protects part of said blade root coming into alignment with the leading edge as far as close to said blade attachment means, said extension of the glove being fixed at least at one point against said blade root by mechanical fixing means.

21. A blade according to claim 2, wherein said blade attachment means comprise, on the blade root, at least one metallic and electrically conducting attachment bushing, wherein said at least one metallic and electrically conducting attachment bushing of said blade root, in order to provide electrical continuity between the glove and the hub, comprise a continuous extension of said glove which extends as far as being in direct connection with said attachment bushing.

22. A blade according to claim 2, wherein said cover has a trailing end which protrudes projecting beyond said trailing edge of the blade.

23. A blade according to claim 2, wherein the cover and the glove comprises a member selected from the group consisting of titanium, stainless steel, and nickel.

* * * * *